S. M. LILLIE.
PROCESS OF EMPLOYING HEAT FOR THE PRODUCTION OF POWER.
APPLICATION FILED JUNE 18, 1919.
Reissued Sept. 16, 1919. 14,726.
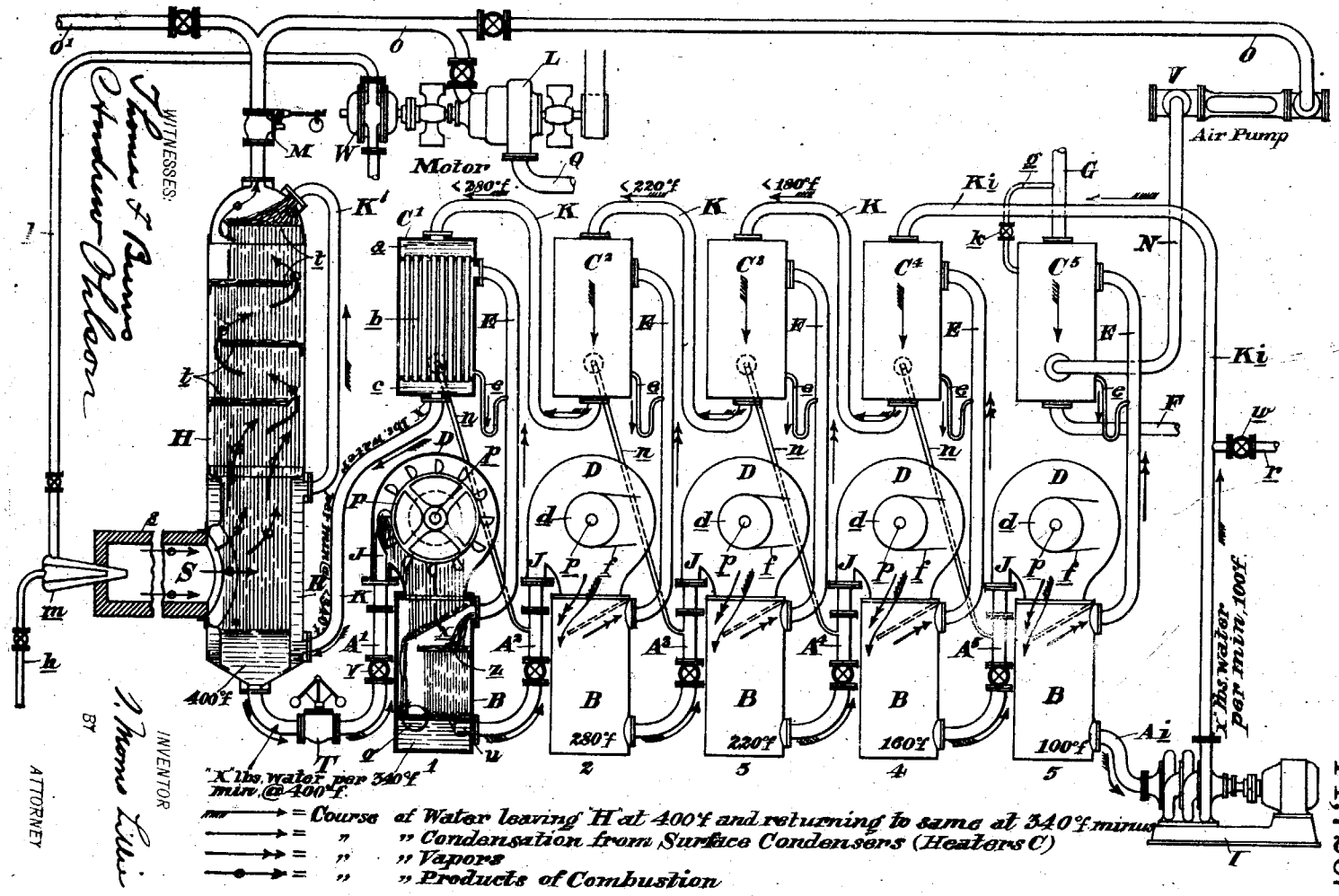
WITNESSES:
Thomas F. Burns
Andrew Ohlson
INVENTOR
S. Morris Lillie
BY
ATTORNEY

UNITED STATES PATENT OFFICE.

SAMUEL MORRIS LILLIE, OF PHILADELPHIA, PENNSYLVANIA

PROCESS OF EMPLOYING HEAT FOR THE PRODUCTION OF POWER.

14,726. Specification of Reissued Letters Patent. Reissued Sept. 16, 1919.

Original application filed April 15, 1914, Serial No. 831,892. Renewed July 17, 1916, Serial No. 109,811. Original No. 1,230,417, dated June 19, 1917. Application for reissue filed June 18, 1919. Serial No. 305,195.

*To all whom it may concern:*

Be it known that I, SAMUEL MORRIS LILLIE, a citizen of the United States, residing at Philadelphia, in the county of Philadelphia and State of Pennsylvania, have invented a new and useful Process of Employing Heat for the Production of Power, of which the following is a specification.

My process consists in heating a liquid, water will be referred to as an example in the following, to a higher temperature; in leading the heated water into a series of inclosed spaces in succession through suitable interconnecting piping, in which spaces the pressures are maintained progressively lower than the boiling pressure of the heated water, in virtue of all of which there is in each inclosed space a flashing into steam of a portion of the water as it enters the space from the pipe leading the water into it; in employing in connection with each inclosed space a suitable motor in which the momentum or pressure of the entering water and flashing steam is used for producing power; and finally in taking the cooled water as it comes from the last and coolest space and delivering the water back into the water heating device to be heated preparatory to another passage through the series of spaces and their connected motors. On its way back from the coolest inclosed space and motor to the heating device the water is passed through a series of condensers, one for each of the spaces hotter than the coolest space, and in the order of their increasing temperatures, whereby the returning water is heated to progressively higher temperatures by the flash steam of the several inclosed spaces after it has been employed in the power producing motors of the several spaces. In the accompanying drawings the motors shown are impulse wheels, one in each inclosed space, on the vanes of which the entering hot water and flashing steam impinge from a suitable nozzle, and is thereby caused to revolve and produce power. In the succeeding portions of this specification the term "motor" will be employed for a nozzle and impulse wheel and the case which includes it and its "space." The apparatus shown for heating the water preparatory to its journey through the series of motors is one in which the water is brought into intimate contact with hot products of combustion under a pressure which will permit of imparting the desired temperature to the water, *i. e.* a pressure above the boiling pressure of the water at the said desired temperature. To this end the combustion of the fuel from which the said products of combustion come is effected under pressures greater than the required pressure for the products of combustion.

In the drawings is shown a series of five motors, 1, 2, 3, 4, and 5 each connected by a vapor main L with its condenser C, which is of the surface condensing type. H is a heater by which the water is heated in the manner stated.

The heater employed for purposes of illustration in the drawing is shown in vertical section. It consists of a vertical column H, closed at top and bottom which has in its upper length a number of horizontal perforated partial partitions or shelves *t* touching alternately opposite walls of the column. The lower length of the column is surrounded by a water jacket R, which jacket at its upper end is in communication with the interior of the column above the uppermost perforated shelf by the pipe $K^1$, and at its lower end is in communication through the pipe $K^1$, with the surface condenser of the hottest motor, 1, as hereinafter described; a connected chamber S, which will be termed the "combustion chamber" opens through the water jacket into the column H at a suitable distance above the bottom of the column.

An oil burner *m* opens through the end of the combustion chamber S opposite the column H. Leading to the burner are two pipes *l* and *h*, the latter of which leads oil to the burner, and the other air, both under pressure greater than that in the column H. The air serves to atomize the oil, and also support its combustion. The walls of the chamber S are of suitable material and construction to resist the temperatures due to the burning fuel. The shells inclosing the column H, water jacket R, and combustion chamber S, are sufficiently strong to resist the internal working pressures; the one indicated in the drawings is that exerted by water at a temperature of 400° F., viz: about 250 lbs. gage pressure. The top of the column H is connected to a motor L, adapted to use a mixture of gas and steam by a pipe O which is fitted with an adjustable safety valve M by which is regulated the pressure at which the gases and steam shall pass to the motor; these latter escape from the motor by the exhaust pipe Q, and may be used for heating purposes if conditions favor such use. The greater this pressure is than the boiling pressure of the water at its temperature in the heater, the less moisture will there be in the gases. By the branch pipe $O^1$, gases and steam may be taken away for other power purposes or for escape into the atmosphere. The motor is connected to a rotary air compressor W which supplies compressed air to the burner *m* through the pipe *l*. From the bottom of the column H a water conducting pipe $A^1$, fitted with a hand valve *v*, leads to a nozzle J, of the first motor 1, which nozzle delivers against the buckets of the impulse wheel of that motor. The motor 1 is shown in vertical section to disclose its internal construction, as is also the surface condenser $C^1$ of motor 1. The five motors are all alike in construction; their surface condensers C too have all the same construction and have similar pipe connections to their respective motors.

Referring to the drawings and to motor, 1, P is an impulse wheel, shown of the Pelton type, inclosed in a case D, which below opens into the well B. Into the case D projects a nozzle J, properly located and formed to deliver an entering liquid into and against the buckets of the impulse wheel and cause it to revolve and deliver power to a pulley *d*, (see the other motors) fitted externally to the case upon the shaft of the wheel, from which pulley power may be taken as by a belt. To this nozzle leads the pipe $A^1$, from the bottom of the heater H.

In the well B just below the passage between it and the wheel case D, is a deflecting plate *x* which extends from one side of the well nearly to the opposite side. From beneath this plate *x* with its mouth protected by the same, a vapor main E leads from the well into the upper part of the tube chamber, *b*, of the surface condenser C, which is shown in vertical section in the drawings. This condenser as shown is of the tubular type. It consists of a battery of vertical tubes extending through chamber *b*, above through a septum or tube plate into a water receiving chamber *a*, and below through another septum or tube plate into the water delivering chamber *c*. A pipe K leads from the chamber *c* into the water jacket R of the heater H, and into the chamber *a* leads a pipe K from the bottom of the condenser $C^2$ of the next coolest motor 2. These condensers are all similar and whatever may be herein said regarding the construction of the condenser of motor, 1, is true for all the other condensers. From the tube chamber near the bottom a drain pipe *e*, for condensation, leads into the vapor main E: its U form causes the condensation (water) passing through it to form a "trap" which prevents vapor passing through it from the main E into the condenser. Returning to motor 1; below the mouth of the main E, the well contains a perforated horizontal shelf *z*. Below it near the bottom of the well B, a water pipe $A^2$ leads to the nozzle J of the next cooler motor 2, and receives the air pipe *n* which leads from the bottom of the tube chamber *b* of the condenser of motor 1. The pipe *n* is supposed to open into the tube chamber *b* at a little higher elevation than does the drain pipe *e*, so that no water will escape through it from the tube chamber. The pipe $A^2$ is fitted in the well B with balanced valve *u* operated by a float *o* in a familiar manner, to maintain a sealing column of water in the well B, and to prevent vapor passing from B into the next cooler motor through the pipe $A^2$.

The top or "*a*" chamber of each condenser receives water through a K pipe from the bottom (chamber *c*) of the condenser of the next cooler motor, with the exception of the condenser $C^5$ of the coolest motor, which condenser receives cooling water by a pipe G from some extraneous source which water passes from the bottom of condenser by the pipe F away from the system of apparatus shown in the drawings, and also with the exception of the condenser ($C^4$) of the next to coolest motor which receives water from the well B of the coolest motor 5 through the pump I, and the pipe connections $A^1$ and $K^1$. The air pipe *n* of each condenser connects to the A pipe which leads from the well B of its motor to the nozzle J, of the next cooler motor, with the exception of the air pipe N of the condenser $C^5$ of the coolest motor, which pipe leads to the vacuum or air pump V. The well B of each motor excepting the coolest one, is connected by a float valve controlled water pipe A with the nozzle J of the next cooler motor. From the bottom of the well B of the coolest motor 5, the pipe $A^1$ delivers to the pump I, which in turn delivers it to the top of the condenser $C^4$ of the motor next hotter than the coolest motor.

The mode of operation of the system of apparatus given in the drawing, and described above, in illustration of my invention is as follows:

Water showering down through the heater H is heated by direct contact with products of combustion which result from the burning of oil, or other suitable fuel brought to the burner *m*, say by the pipe *h* by means of air delivered to the burner through the pipe *l*. The gaseous products of combustion flow from the combustion chamber S into the heater H, and with a general upward movement flow back and forth across the column of showering water, as directed by the partial partitions or shelves *t* and having imparted more or less of their heat to the water, escape proportionately cooled from the top of the heater by pipe O to a motor L, to the vacuum pump V or to any other suitable kind of motor—in which, assisted by more or less steam which escapes from the heater with them, the gases produce power which may be used for various purposes—compressing air, for example, for use in the burner *m*. The temperatures to which the water will be brought in the heater H will depend upon the pressure maintained in the heater which pressure is controlled by the adjustable relief valve M in the pipe O. In a pressure drawing this valve M is assumed to be set to open at one above about the pressure of water or saturated steam, corresponding to a temperature of 400° F., viz: about 250 lbs. per square inch above atmospheric pressure. As before stated the oil and air are delivered to the burner *m* at a sufficiently high pressure to cause a proper operation of the burner *m* and combustion of the oil in the chamber S, assuming proper quantities of oil and air to be supplied to the burner.

When the apparatus of the drawings is in normal operation water stands in the bottom of the heater H of a sufficient depth to trap the outlet pipe $A^1$ with respect to the gases and vapors in the heater. In the well B of each motor the water automatically maintained by the float valve, stands well above the inlet to the float valve *u* and traps the same with respect to the vapors in B, and the water spaces of all the condensers are filled with water. The course of the water through the system is from the bottom of the heater H, as controlled by the hand valve *v*, through an A pipe into the hottest motor 1, and then by the A pipes from motor to motor in succession, then from the coolest motor 5 by the pipe $A^1$ the pump I by which the water is forced through the K pipes and the surface condensers of all the motors, but the coolest motor, in the order of their increasing temperatures, viz: through the condensers of the motors 4, 3, 2, 1, into the water jacket R of the heater, and thence by the pipe $K^1$ into the heater H upon its uppermost perforated plate *t*, whence it showers down to the water column in the bottom of the heater, being heated in its fall by the hot products of combustion flowing into the heater from the combustion chamber S, as hereinbefore set forth. The flow of the water motor to motor, and to the pump I from the coolest motor, and thence back through the condensers to the water heater H, is automatically controlled by the float valves *u* and floats *o* in the wells B of the respective motors: the floats as they rise increasingly open the valves, and as they fall increasingly close the same. The result of this is that the rate of flow or circulation through the closed series of apparatus is controlled by the hand valve *v* or other device in the water pipe $A^1$ leading from the bottom of the heater H to the nozzle J of the hottest motor 1; in proportion as this valve *v* is opened is the rapidity of the circulation of the water through the series of apparatus. In this pipe $A^1$ may be located a governor valve T for maintaining a uniform rotation speed of the impulse wheels by automatically varying the quantity of water passing through the pipe. Water may be added to the water in circulation by opening the valve *k* in the pipe *g*, which leads from the water main G into the condenser of the coolest effect 5, below the upper tube plate of the condenser: this water joins the condensed vapors from the motor 5, and flows into the well B of that motor through the *e* pipe and E pipe leading to the latter. Water may be taken from the water in circulation by opening valve *w* of the pipe *r* which branches from the $K^1$ pipe leading from the pump I by opening valve *w*.

The cooling water from the main G passing through the tubes of the condenser $C^5$ in connection with the vacuum or air pump V maintains in the tube chamber of the condenser and in the connected motor 5, a certain absolute pressure, and the temperature of the water in the motor is its boiling temperature at that pressure. In the drawings a temperature of 100° F. is indicated for the coolest motor 5, which corresponds to about 2″ of mercury absolute pressure, or to 28″ vacumm with barometer of 30″. The temperature and pressure in the motor 4, are necessarily higher than in the motor 5, because the cooling water for the condenser $C^4$, of motor 4 is the 100° water from motor 5. The temperature and pressure in motor 3 is necessarily higher than in motor 4, higher in 2 than in 3 and higher in 1 than in 2, for the reason that the cooling water used in the condensers is the water which leaves the motor 5 (at 100° F. in the example of the drawings) and that it all passes through the condensers of motors 4, 3, 2 and 1 in succession in the order named. The temperatures in the several motors are automatically adjusted. It is assumed that the total fall in temperature is equally divided between the elements of the apparatus; in the drawings the several temperatures are taken to be 400° F. (250 lbs. gage pressure about) in the heater H, and 340, 280, 220, 160 and 100 degrees in the motors 1, 2, 3, 4, and 5 respectively. The water, on its way from the coolest motor to the heater, leaves each condenser necessarily cooler than the temperature in the corresponding motor but.

for simplicity's sake, the temperatures noted for the water in the drawings are those of their respective motors each preceded by the words "less than."

The water at 400° F (250 lbs. pressure) flowing from the heater H through the pipe $A^1$ to the motor 1, after it passes the valve control *v* in the pipe A is influenced by the lower pressure in the motor 1, and steam forms throughout the mass of the flowing water in increasing proportions as the water approaches its discharge from the nozzle J against the buckets of the impulse wheel P. The weight of water which thus turns to steam is whatever is necessary to absorb as latent heat the sensible heat the entering water loses in falling to the temperature in motor 1. The steam in forming and also in expanding as it moves to the discharge from the nozzle J imparts to the water an increasing velocity and energy with a corresponding condensation of flash steam and this accumulated energy and that of the remaining steam is imparted to the impulse wheel P, to a degree depending upon the efficiency of the wheel and upon the proportion of the entering water and steam which impinge on the wheel. From the buckets of the wheel both water and steam pass into the well B of the motor, the water falls to the bottom of the well while the steam passes through the pipe E into the tube chamber *b* of the condenser C in which it is condensed to water. This "condensation" (water) gravitates to the bottom of the said chamber and passes through the trap tube *e*, into the vapor pipe E, and down it against the rising vapors into the well B, upon the perforated plate *z*, and thence in a shower through the steam space below to the water at the bottom of the well. This returned "condensation" represents all the water which went to the condenser $C^1$ from motor 1 either as steam, or as entrainment in the steam, and consequently the water which will pass from the motor 1 to the motor 2, will be the same in weight as that which entered the motor 1 from the heater H. The "condensation" in returning to the water in the well B of the motor is heated approximately to the temperature of the water in the well by the steam through which it falls in the pipe E and in the well B. The operation of each of the other motors and its condenser, is similar to that of the motor 1 and its condenser C, with the exception of the condenser of the coolest motor which differs in that the cooling water for it comes from a source extraneous to the apparatus of the drawing, and also in that the incondensable gases pass from it through a connecting pipe (N) to an air pump instead of through an *n* pipe into the A pipe leading to a next cooler motor. The gases escaping from each hotter motor condenser eventually find their way through the intervening motors, condensers and *n* and A pipes to the condenser of the coolest motor and thence to the air pump, or to other means for exhausting the air.

Power may be taken from the shafts of the impulse wheels by any suitable means, such as by the pulleys and belts as illustrated in the drawing. For convenience of illustration, and description, the motors are shown with the sides of the impulse wheels of the several motors toward the observer; the motors could be arranged to have the said impulse wheels on the same line of shafting from which power might be taken at one or more points.

Surface condensers are shown in the drawings, but I do not limit myself to condensers of that class, and jet condensers in which steam is condensed by contact with the cooling water, may be employed instead with means, such as pumps, for passing the cooling water along from condenser to condenser and into the heater H from the hottest condenser; by "cooling water" is understood the water flowing from the well B of the coolest motor. Provisions may be made for taking down from each jet condenser to its connected motor well an amount of water equivalent to the steam and entrained water that pass to the condenser from its said motor.

I do not limit my invention to the particular type or construction of means shown and described for heating or reheating the water circulating through the series of apparatus, nor do I limit it to the details of construction and operation shown and described. For example instead of devices (such as floats *o* and valves *u*) for automatically regulating the flow of water from motor to motor through the A pipes, hand valves in the A pipes may be used; such valves are indicated in the A pipes. If these hand valves are opened sufficiently wide, steam as well as water will pass from motor to motor which steam, lessened at least by the power obtained from it, would eventually reach the condenser $C^5$ of the coolest motor and be condensed and returned to the circulating water.

The gaseous products of combustion which escape from the top of the heater H through the pipe O, are mixed with water vapors or steam to at least the point of saturation at their pressure and temperature.

If the quantity of combustion of fuel in chamber S is regulated to give a greater quantity of heat than is taken away by the circulating water to the motors then steam is generated beyond the saturation quantity and passes away with the gases through the pipes O and O, and the construction H becomes a generator of steam for power or other purposes as well as a water heater.

Oil is mentioned as the fuel burned in the chamber S, but other fuels may be used, for example any fluent fuel-oil mixed with pulverized coal, or pulverized coal itself may be blown into the chamber S, and be consumed. Again it is possible to place a grate in the chamber S with means for delivering coal upon the same against the pressure in the chamber S, and means for delivering compressed air beneath the grate.

Certain provisions which would be useful in practice are not shown in the drawings, in order to not complicate the drawings, such as drain connections for emptying the parts of the apparatus of water should occasion require its being done.

It is apparent that the apparatus merely as shown and described could not well be started from a cold condition. Additional means would have to be provided to deliver the air and fuel under pressure into the combustion chamber S, and also means for circulating the water in the heater H until it became sufficiently heated to serve for power purposes in the motor. But the illustration of these several means is not necessary to the elucidation of my invention and mere reference to them is considered sufficient.

An evident variation of the process would be to discard from the system the water which flows away from the coolest motor by the pipe $A^1$ and instead of it, send the extraneouns water heated in the coolest condenser $C^5$, through the condensers in succession into the heater H and thence down through the motors and away to waste, or to other use, through the pipe $A^1$. Regarding the system by itself this variation would give less economy than the closed method of operating in proportion as the water flowing away from pipe $A^1$ is warmer than the extraneous water leaving the bottom of the condenser $C^5$. If a liquid, other than water, needed to be heated be at hand in sufficient quantities it may be used as the cooling agent in the coolest condenser $C^5$, and again this liquid may be sent through the system instead of water and be the agent of employing the heat for the generation of power.

The procedure described in this last paragraph may be considered to be one of heating a liquid by a hotter liquid by flashing the hotter liquid down to lower and lower temperatures in closed flash chambers, and in condensing the several resulting vapors in the order of their increasng temperatures by the cooler liquid, whereby the latter is heated to progressively higher temperatures.

The work done in the case of each motor is due to the momentum of the entering water and to the energy in the forming and expanding steam which energy is imparted to the motor partly through the agency of the water to which it adds an increasing velocity and partly through the energy which is unabsorbed by the water.

The reaction of the forming and expanding steam in each interconnecting water pipe A and its nozzle J, tends to impede the flow of the water from the preceding motor. To neutralize or overcome this reaction, the flow may be assisted by a pump or by other means.

If the liquid passed through the system be water, or an aqueous solution, the flashing product in the several spaces will be "steam" otherwise it would be vapor of the liquid used. In the claims it is assumed that the liquid is water or an aqueous solution; the flashing product is termed "steam" in the claims.

I claim as of my invention the matters set forth in the following claims, viz:

1. The process of obtaining power from heat consisting in bringing hot gaseous products of combustion of a fuel into intimate contact with a liquid and thereby heating it to a higher temperature; in separating the uncondensed gaseous products of combustion from the heated liquid; in leading this heated liquid into a space in which the pressure is lower than the boiling pressure of the liquid at the said higher temperature, and in using vapor formed from the liquid on entering the space of said lower pressure in a motor for the production of power.

2. The process of obtaining power from heat consisting in bringing hot gaseous products of combustion of a fuel into intimate contact with a liquid and thereby heating it to a higher temperature; in separating the uncondensed gaseous products of combustion from the heated liquid; in leading this heated liquid into a space in which the pressure is lower than the boiling pressure of the liquid at the said higher temperature, and in using the liquid entering the space of said lower pressure in a motor for the production of power.

3. The process of obtaining power from heat consisting in bringing the hot gaseous products of combustion of a fuel into intimate contact with a liquid in a vessel and thereby heating the liquid to a higher temperature; in separating the uncondensed gaseous products of combustion from the heated liquid; in leading this heated liquid into a space in which the pressure is lower than the boiling pressure of the liquid at the said higher temperature; and in using for the production of power the liquid entering the space of the said lower pressure, and the steam flashed from the liquid due to the lower pressure.

4. The process of obtaining power from heat consisting of bringing hot gaseous products of combustion of a fuel into intimate contact with a liquid and thereby heating the liquid to a higher temperature; in separating the uncondensed gaseous products of combustion from the heated liquid; in leading this heated liquid into a space in which the pressure is lower than the boiling pressure of the liquid at the said higher temperature; in using the liquid on entering the space of said lower pressure in a motor for the production of power; in reheating the unvaporized liquid by intimate contact with gaseous products of combustion and again leading it to suitable motors for the production of power.

5. The process of obtaining power from heat consisting in bringing the hot gaseous products of combustion of a fuel into intimate contact with a liquid in a closed vessel, and thereby heating the liquid to a higher temperature; in separating the uncondensed gaseous products of combustion from the heated liquid, and in leading the uncondensed gaseous, products of combustion from the said closed vessel into a motor operating under lower pressure than that existing in the said closed vessel and thereby obtaining power from the said gaseous products of combustion.

6. The process of obtaining power from heat consisting in bringing the hot gaseous products of combustion of a fuel into intimate contact with a liquid in a closed vessel, and thereby heating the liquid to a higher temperature; in separating the uncondensed gaseous products of combustion from the heated liquid; in leading the uncondensed gaseous products of combustion from the said closed vessel into a motor operating under lower pressure than that existing in the said closed vessel and thereby obtaining power from the said gaseous products of combustion, and in employing said power for forcing air into the combustion chambers, for the said fuel.

7. The process of obtaining power from heat consisting in bringing hot gaseous products of combustion of a fuel into intimate contact with a liquid in a closed vessel with a production of vapor from the liquid in the vessel; in separating the condensed gaseous products of combustion from the said liquid; and in leading the uncondensed gaseous products of combustion mixed with vapor produced in the said closed vessel into a motor operating under lower pressures than that existing in the said closed vessel and thereby obtaining power from the said mixture of gaseous products of combustion and vapors.

8. The process of obtaining gases and steam in condition suited to various uses by means of heat and a liquid, consisting in bringing hot gaseous products of combustion of a fuel into intimate contact with a liquid in a closed vessel whereby the liquid is heated to a higher temperature; in separating the uncondensed gaseous products of combustion from the heated liquid preparatory to their use for any suitable purpose, and in leading this separated heated liquid into an inclosed space in which a pressure is maintained below that of the boiling pressure of the liquid at the said higher temperatures, whereby a portion of the liquid is flashed into steam ready for use for any suitable purpose.

9. The process of using heat for the production of power consisting in using it to heat a liquid to a suitably higher temperature; in leading the heated liquid into and through a series of inclosed spaces in succession through suitable interconnecting piping, in maintaining in said spaces, respectively, pressures progressively lower than the boiling pressure of the heated liquid and in the order in which the heated liquid passes through the spaces in succession; and in each space directing the entering liquid against an impulse wheel adapted to absorb energy from the impinging liquid, and to deliver the energy through proper interconnecting means to mechanism exterior to said space.

10. The process of using heat for the production of power consisting in using it to heat a liquid to a suitably higher temperature; in leading the heated liquid into and through a series of inclosed spaces in succession through suitable interconnecting piping; in maintaining in said spaces, respectively, pressures progressively lower than the boiling pressure of the heated liquid, and in the order in which the heated liquid passes through the spaces in succession; in each space employing the energy of the entering liquid and flashing steam for the production of power, and in condensing steam liberated in one or more of the inclosed spaces, and delivering the condensate back into the liquid flowing through the said spaces.

11. The process of using heat for the production of power consisting in using it to heat a liquid to a suitably higher temperature; in leading the heated liquid into and through a series of inclosed spaces in succession through suitable interconnecting piping; in maintaining in said spaces respectively, pressures progressively lower than the boiling pressure of the heated liquid, and in the order in which the heated liquid passes through the spaces in succession; in each space, employing the energy of the entering liquid and flashing steam for the production of power; in condensing steam liberated in one or more of the inclosed spaces and delivering each condensate back into the space from which it came.

12. The process of using heat for the production of power consisting in using it to heat a liquid to a suitable higher temperature; in leading the heated liquid into and through a series of inclosed spaces in succession through suitable interconnecting piping; in maintaining in said spaces respectively, pressures progressively lower than the boiling pressure of the heated liquid, and in the order in which the heated liquid passes through the spaces in succession; in each space, employing the energy of the entering liquid and flashing steam for the production of power; in condensing steam liberated in one or more of the inclosed spaces and delivering each condensate back into the space from which it came through and in contact with the steam therein whereby it is heated to approximately the temperature of the said steam.

13. The process of using heat for the production of power consisting in using it to heat a liquid to a suitably higher temperature; in leading the heated liquid into and through a series of inclosed spaces in succession through suitable interconnecting piping; in maintaining in said spaces, respectively, pressure progressively lower than the boiling pressure of the heated liquid, and in the order in which the heated liquid passes through the spaces in succession; in each space, employing the energy of the entering liquid and flashing steam for the production of power in condensing the steam from one or more of the motors by a liquid and thereby heating the liquid; and in passing the liquid thus heated through a series of spaces and motors having progressively lower temperatures for the production of power.

14. The process of using heat for the production of power consisting in using it to heat a liquid to a suitably higher temperature; in leading the heated liquid into and through a series of inclosed spaces in succession through suitable interconnecting piping; in maintaining in said spaces, respectively, pressures progressively lower than the boiling pressure of the heated liquid; in the order in which the heated liquid passes through the spaces in succession; in each space employing the energy of the entering liquid and flashing steam for the production of power; in condensing the steam from one or more of the motors by a liquid and thereby heating the liquid; in further heating this liquid to a suitably higher temperature by heat from an extraneous source; and in passing the liquid thus heated through a series of spaces and motors having progressively lower temperatures.

15. The process of using heat for the production of power consisting in using it to heat a liquid to a suitably higher temperature; in leading the heated liquid into and through a series of inclosed spaces in succession through suitable interconnecting piping; in maintaining in said spaces, respectively, pressures progressively lower than the boiling pressure of the heated liquid, and in the order in which the heated liquid passes through the spaces in succession; and in each space employing the momentum of the entering liquid and flashing steam for the production of power.

16. The process of obtaining power from heat consisting in passing a continuous current of liquid through a heating device and heating it during its passage through the same to a suitably higher temperature; in leading this current of heated liquid into an inclosed space in which is maintained a lower pressure than the boiling pressure of the heated liquid; in using for power producing purposes the flash steam formed from the liquid in the same inclosed space of lower pressure; and in returning the liquid not flashed into steam in the said inclosed space back into and through the heating device as a portion at least of the said continuous current of liquid.

17. The process of obtaining power from heat consisting in passing a continuous current of a liquid through a heating device and heating it during its passage through the same to a suitably higher temperature; in leading the heated liquid through a series of inclosed spaces in succession through suitable interconnecting piping; in maintaining in said spaces, respectively, pressures progressively lower than the boiling pressure of the heated liquid and in the order in which the heated liquid passes through the spaces in succession, and in employing the energy of the entering liquid and flashing steam formed in said spaces for the production of power.

18. The process of obtaining power from heat consisting in passing a continuous current of a liquid through a heating device and heating it during its passage through the same to a suitably higher temperature; in leading the heated liquid through a series of inclosed spaces in succession through suitable interconnecting piping; in maintaining in said spaces, respectively, pressures progressively lower than the boiling pressure of the heated liquid and in the order in which the heated liquid passes through the spaces in succession; in employing the energy of the entering liquid and flashing steam formed in said spaces for the production of power, and in delivering the liquid from the space of lowest pressure back into and through the said heating device as a portion (at least) of the said continuous current of liquid.

19. The process of obtaining power from heat consisting in passing a continuous current of a liquid through a heating device and heating it during its passage through the same to a suitably higher temperature; in leading the heated liquid through a series of inclosed spaces in succession through suitable interconnecting piping; in maintaining in said spaces, respectively, pressures progressively lower than the boiling pressure of the heated liquid and in the order in which the heated liquid passes through the spaces in succession; in employing the energy of the entering liquid and flashing steam formed in said spaces for the production of power; in delivering the liquid from the space of lowest pressure back into and through the said heating device as portion (at least) of the said continuous current of liquid, and in heating the liquid on its way back to the heating device from the space of lowest pressure in succession by the steam generated in one or more of the said inclosed spaces in the order of their increasing temperatures.

20. The process of obtaining power from heat consisting in passing a continuous current of a liquid through a heating device and heating it during its passage through the same to a suitably higher temperature; in leading the heated liquid through a series of inclosed spaces in succession through suitable interconnecting piping; in maintaining in said spaces, respectively, pressures progressively lower than the boiling pressure of the heated liquid and in the order in which the heated liquid passes through the spaces in succession; in employing the energy of the entering liquid and flashing steam formed in said spaces for the production of power; in delivering the liquid from the space of lowest pressure back into and through the said heating device as a portion (at least) of the said continuous current of liquid, and in adding liquid to the liquid thus circulating in a cycle through heating device and motors to make up losses from the circulating liquid.

21. The process of heating a liquid by a hotter liquid consisting in flashing the hotter liquid down to lower and lower temperatures in succession in closed flash chambers in which corresponding progressively lower pressures are maintained, and in condensing the several vapors resulting from the flashings in the order of their increasing temperatures by the cooler liquid, whereby the latter is heated to progressively higher temperatures.

SAMUEL MORRIS LILLIE.